United States Patent Office 3,511,993
Patented May 12, 1970

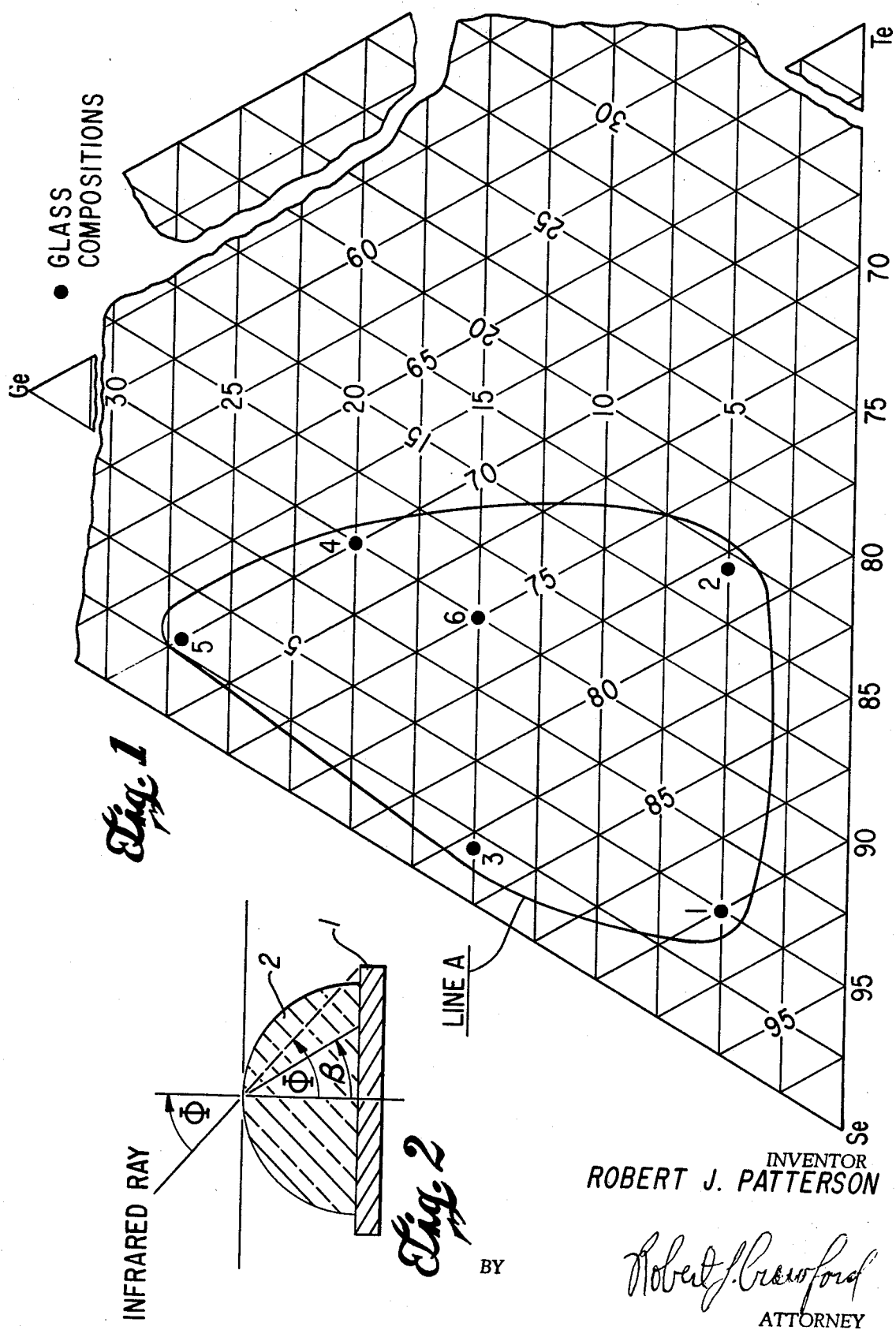

3,511,993
Ge-Se-Te GLASS IN AN INFRARED DETECTION SYSTEM
Robert J. Patterson, Beaverton, Oreg., assignor to Texas Instruments Incorporated, Dallas, Tex., a corporation of Delaware
Filed Oct. 18, 1967, Ser. No. 676,237
Int. Cl. C03c 3/12, 3/30
U.S. Cl. 250—83
2 Claims

ABSTRACT OF THE DISCLOSURE

Disclosed are compositions of matter comprising germanium, selenium, and tellurium which have been found to be glasses transmitting in the infrared region of the electromagnetic spectrum. Also disclosed are methods of compounding these compositions and of obtaining viscosity data for the glasses and an illustration of the use of the glass compositions of this invention as transmitting elements within an infrared detection system.

---

This invention relates to amorphous compositions of matter comprising germanium, selenium, and tellurium which have been found to be glasses transmitting in the infrared region of the electromagnetic spectrum. The invention disclosed herein pertains to a new region of germanium-selenium-tellurium amorphous compositions separate and distinct from those regions disclosed in copending patent applications Ser. No. 450,125 filed Apr. 22, 1965 now U.S. Pat. 3,348,045 and Ser. No. 603,623 filed Dec. 21, 1966, now U.S. Pat. 3,440,068 and assigned to Texas Instruments Incorporated, also the assignee of the present application.

The glasses of the invention may contain about 5–27 atomic percent germanium, 70–90 atomic percent selenium, and from 2–17 atomic percent tellurium and may be made by reacting the constituents at a temperature above about 800° C. to form a melt and then quench cooling the melt. The invention provides glass compositions having good transmission in the 1–20 micron wavelength region of the electromagnetic spectrum.

It is therefore an object of the invention to provide a ternary amorphous composition comprising from 5–27 atomic percent germanium, 70–90 atomic percent selenium, and 2–17 atomic percent tellurium.

Other objects of the invention are to provide ternary germanium-selenium-tellurium glass compositions exhibiting high softening and strain points and good transmittance at high temperature in the 1–20 micron wavelength region of the electromagnetic spectrum.

A further object of the invention is to provide a ternary germanium-selenium-tellurium glass composition having the high resistance to decomposition and devitrification required for the remelting and slow cooling operations associated with casting.

These and other objects, advantages, and features of the invention will became more readily understood from the following detailed description when read in conjunction with the appended claims and attached drawings wherein:

FIG. 1 depicts a ternary diagram of the atomic percentages of germanium, selenium, and tellurium for the various compositions of matter of the invention, FIG. 2 illustrates one particular form of the glass compositions of this invention, usable as an infrared transmitting element, such as a dome or lens within an infrared detection system.

The general procedure for making the compositions of the invention may be described as follows. The appropriate amount of the constituents are weighed and then placed in a previously cleaned quartz ampoule. The constituents are placed in the cleaned ampoule, which is then evacuated to about $10^{-3}$ torr and sealed by fusion. The sealed ampoule is placed in a furnace and gradually heated to a temperature above about 800° C. during a period of about four hours and held at that temperature for a time sufficient for the constituents to react completely with one another, such as fifteen hours. The furnace may be of any suitable design to provide agitation of the consituents so as to achieve complete reaction thereof. The ampoule containing the sample is then rapidly withdrawn from the furnace to room air to air quench cool the melt to a solid. The sample is then allowed to cool more slowly to room temperature by wrapping the ampoule with quartz wool insulation. The fused quartz ampoule is then broken and the glassy material removed.

The sample compositions which were found to form glasses by the air quench cooling technique are presented in Table I below.

TABLE I.—AMORPHOUS COMPOSITIONS

| Sample No. | Composition (Atomic Percent) | | |
|---|---|---|---|
| | Germanium | Selenium | Tellurium |
| 1 | 5 | 90 | 5 |
| 2 | 5 | 78 | 17 |
| 3 | 15 | 83 | 2 |
| 4 | 20 | 70 | 10 |
| 5 | 27 | 70 | 3 |
| 6 | 15 | 75 | 10 |

The amorphous compositions presented in Table I are indicated in FIG. 1 by black circular dots. In the figure, a boundary line, line A, is drawn to designate the glass forming composition region of the present invention.

A polished sample 0.85±0.15 mm. thick was placed in an enclosure provided with suitable heating means and a pointed quartz rod, spring-loaded to 70 grams, pressed against one face. The rod was in perpendicular alignment with respect to the sample, and the point defined a 90° included angle. A thermocouple measured the temperature of the opopsite face. The temperature was raised at a rate of 8 to 10° C. per minute until the point penetrated 0.05 mm. into the sample. This "softening point" was designated method A softening point and corresponded to a viscosity of $1 \times 10^{10.2}$ poise as determined by calibration against a standard glass, No. 712, obtained from the National Bureau of Standards. A second softening point, designated method B, was determined by allowing the pointed quartz rod to penetrate 0.45 mm. into the sample. Method B softening point corresponded to a viscosity of $1 \times 10^{8.8}$ poise. The two softening points were used to determine the strain point for each sample and to characterize glasses of various compositions. An important property of glasses to be used at high temperatures is the strain point. This point is the temperature at which the glass has a viscosity of $1 \times 10^{14.6}$ poise and may be taken as the maximum use temperature for the glass. Above this temperature, permanent strains may be introduced into the glass. Strain points for each sample may be readily determined by plotting softening point A and softening point B as reciprocal absolute temperatures against the logarithm to the base ten of their corresponding viscosities and drawing a straight line through these points. The strain point temperature is derived from the viscosity point $1 \times 10^{14.6}$ poise in the plot.

The softening points and strain points for the glasses of the invention are given in Table II.

TABLE II.—VISCOSITY TEMPERATURE DATA

| Sample No. | Softening points, ° C. | | Strain point, ° C. |
| --- | --- | --- | --- |
| | Method A | Method B | |
| 1 | 98 | 113 | 59 |
| 2 | 156 | 171 | 114 |
| 3 | 163 | 185 | 106 |
| 4 | 204 | 227 | 145 |
| 5 | 295 | 331 | 208 |
| 6 | 189 | 214 | 125 |

Each of the glass compositions disclosed herein were found to transmit infrared radiation, i.e., electromagnetic radiation in the 1–20 micron region. The glass compositions of this invention offer substantial advantages for the fabrication of transmitting elements and are particularly characterized by being readily castable into large sizes and complex shapes. Moreover, since the refractive index and transmittance of these glasses vary slightly with composition, their optical characteristics may be tailored to suit specific applications.

FIG. 2 depicts a form of the glass compositions of this invention usable within a particular infrared detecting system. The detecting system is normally composed of a detector 1 having a responsive element sensitive to infrared energy striking its surface, and an infrared transmitting element 2 such as a dome or lens in optical connection with the detector. The optical properties of the amorphous compositions of this invention make them particularly suited among other applications for use as a transmitting element 2. In addition to being substantially transparent to infrared rays over a broad range of the infrared spectrum, all of the compositions have relatively high indexes of refraction compared to oxide glasses. Consequently, when infrared rays strike the dome 2 at the incident angle phi, as pictured in FIG. 2, the high index of refraction of the dome material causes the rays to be bent toward the detector unit 1 at the angle of refraction, beta, thus increasing the efficiency of detection.

Although the invention has been described with reference to a preferred method of making the amorphous compositions of matter and to a preferred use thereof, other methods and uses may be devised without departing from the spirit and scope of the invention as defined by the appended claims.

What is claimed is:

1. A ternary glass composition consisting essentially of germanium, selenium, and tellurium and lying within the region circumscribed by line A in the ternary diagram of FIG. 1.

2. An infrared detection system including a detector sensitive to infrared energy and a transmitting element in optical connection with said detector, said transmitting element comprising a glass composition consisting essentially of germanium, selenium, and tellurium and lying within the region circumscribed by line A in the ternary diagram of FIG. 1.

References Cited

UNITED STATES PATENTS 3,348,045   10/1967   Brau et al. _____ 106—47
3,440,068   4/1969    Patterson et al. _____ 106—47

HELEN M. McCARTHY, Primary Examiner

U.S. Cl. X.R.

106—47